J. B. MOWRY.
COMBINED CHECK AND GLOBE VALVE AND TRIMMER.
APPLICATION FILED DEC. 21, 1914.
1,244,758. Patented Oct. 30, 1917.
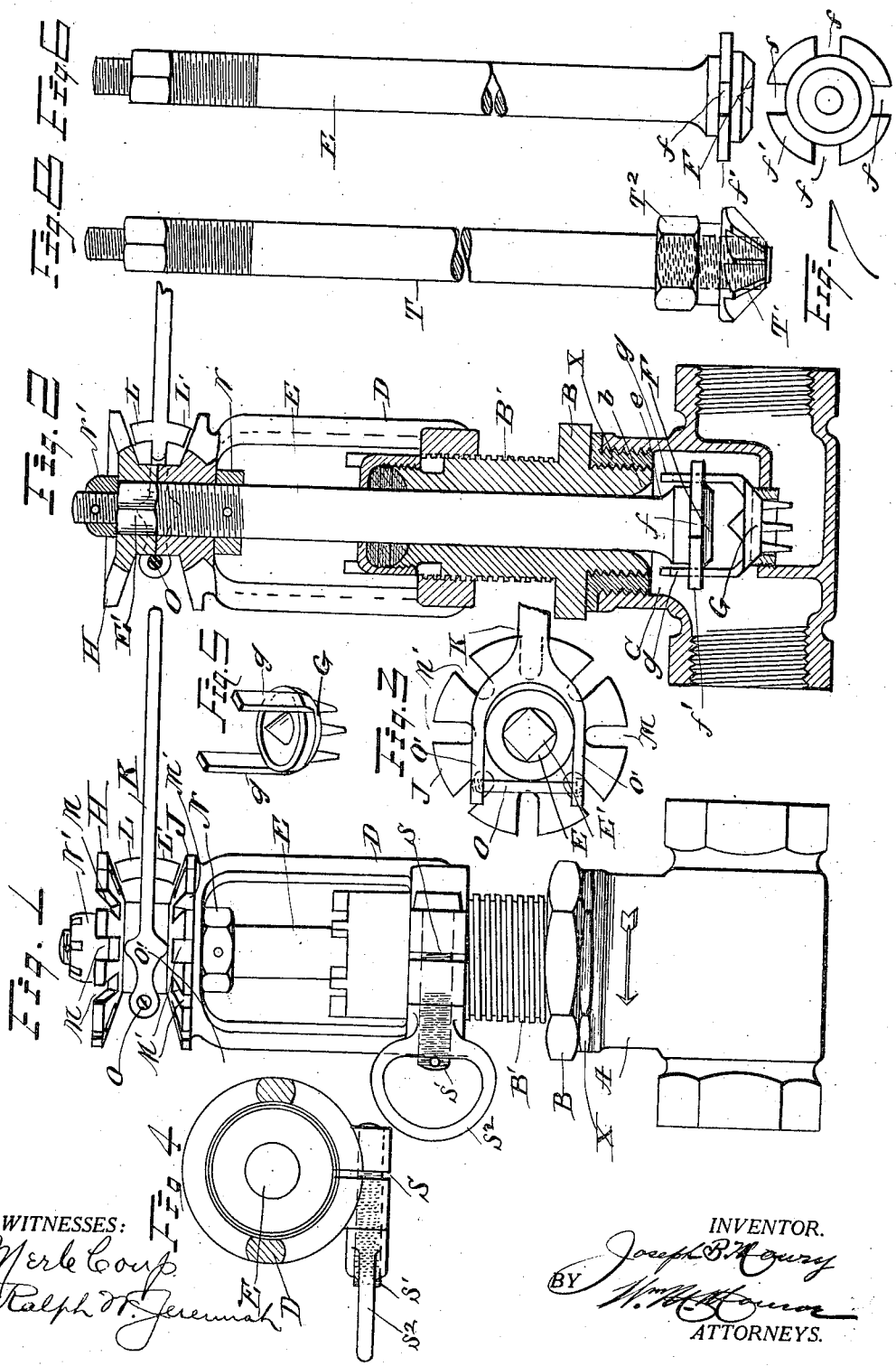

UNITED STATES PATENT OFFICE.

JOSEPH B. MOWRY, OF CLEVELAND, OHIO.

COMBINED CHECK AND GLOBE VALVE AND TRIMMER.

1,244,758. Specification of Letters Patent. Patented Oct. 30, 1917.

Application filed December 21, 1914. Serial No. 878,430.

*To all whom it may concern:*

Be it known that I, JOSEPH B. MOWRY, a citizen of the United States, and resident of Cleveland, in the county of Cuyahoga and State of Ohio, have invented certain new and useful Improvements in Combined Check and Globe Valves and Trimmers, of which I hereby declare the following to be a full, clear, and exact description, such as will enable others skilled in the art to which it appertains to make and use the same.

The invention relates to the class of valves employed in work requiring the use of fluids under high pressure, and the objects are to provide means facilitating cutting and regrinding the valve seat to produce a perfectly tight closure when the valve is closed, and the invention also includes a combined globe and check valve which can be used interchangeably at the pleasure of the operator, that is it can be used as a check valve, or the check valve portion can be removed to permit the globe valve to be used.

It also includes a check valve which can be regulated to adjust the amount of flow of the fluid passing therethrough.

The invention includes means for employing a cutting or reaming tool in lieu of the valves, to prepare the seat for the valve, and the cutting tool with the accompanying operating parts of the valve can be inserted in any valve casing of ordinary type and employed to trim, face and renew new or old valve seats.

The invention comprises the combination and arrangement with the valve seat and casing and closure therefor or plug, of a suitable valve and valve stem, and a yoke or stem supporting member which is adjustable upon said closure, for operating the valve, and a separate means for rotating the valve.

The device also includes means for rotating said yoke and for separately rotating said valve stem.

The invention includes a separate stem interchangeable with the valve stem and having a cutting or reaming tool adjustably attached thereto.

The invention is illustrated in the accompanying drawings, hereinafter more fully described, and specifically pointed out in the claims.

In the accompanying drawings Figure 1 is a side elevation of the device; Fig. 2 is a longitudinal central section therethrough; Fig. 3 is a plan view of the upper portion of the yoke; Fig. 4 is a plan view of the lower portion of the yoke; Fig. 5 is a perspective view of the check valve; Fig. 6 is a side elevation of the valve stem and globe valve attached thereto; Fig. 7 is a plan view of the globe valve showing means thereon for engaging the check valve; Fig. 8 is a side elevation of the stem to which the cutting tool is adjustably secured.

In these views A is the valve casing, B is a plug or other suitable closure for the opening C in the casing through which the valve is inserted. D is a yoke adjustable upon the outer screw threaded extremity B' of the plug.

The stem E passes loosely through the yoke and does not revolve therewith. The stem also passes through the closure B and the lower extremity of the stem is provided with a shoulder $e$ which is capable of making a fluid tight joint with the correspondingly shaped seat $b$ in the plug.

The valve stem is longitudinally movable with the yoke and is attached thereto by means of nuts N, N' which permit the yoke to revolve upon the stem.

F is a globe valve which may be seated upon the valve seat located within the casing when the check valve is removed, and G is a check valve which can be used in connection with the globe valve and is slidingly movable thereon by means of guides $g$, $g$, which project upward from the sides of the check valve and engage slots $f$, $f$, in a flange $f'$ upon the globe valve. This construction permits the check valve to rise and fall unimpeded over its seat, and since the globe valve is adjustable vertically this means of adjustment can be utilized to control the amount of opening of the check valve.

By screwing down the yoke until the check valve is tight upon its seat the valve opening can be closed in the same manner that it would be closed by the globe valve alone.

Means are also provided for rotating the valves, either the check or globe valve or both of them, to regrind the seat so as to refinish it when it becomes worn.

To accomplish this action a disk H is secured to the upper end of the valve stem preferably by squaring the same as shown at E'. This disk is rotated to rotate the valve. To make it convenient to rotate the yoke to obtain vertical adjustment of the yoke so that the valve can be vertically adjusted and to alternately rotate the stem to regrind the valve and seat, the yoke terminates in the disk J parallel to the disk H and intermediate of these disks is pivoted the yoke lever K which is provided with oppositely extending lugs L, L', which can alternatively be engaged with the marginal opening M, M' in the disks H and J respectively.

The pivotal shaft is preferably a rod O joining the arms O' O' of the yoke lever, and which can be removed so as to permit the lever to be withdrawn. By alternately engaging said yoke lever with said disks all the operations connected with the valve can be performed.

The lower portion of the yoke is split at S and the parts are connected by means of the eye bolt S'.

This connection forms a clamp by means of which the yoke is held from movement when adjusted to give the proper elevation of movement to the check valve. It also serves to retain the cutting tool in rigid position when used as will be hereinafter described.

The cutter by means of which the valve seat is trued up and trimmed to renew it when worn, and by means of which a valve seat can be cut in any casing, is illustrated in Fig. 8. Here T is a steel stem, interchangeable with the valve stem in the yoke and disk H, and secured in the same manner to the yoke.

T' is a cutter or reamer adjustably secured upon the extremity of the steel stem by means of the nut T².

In Figs. 1 and 2, a sleeve X is shown which can be used as an extra collar or thimble to adapt the yoke and valve to a larger size of casing.

The addition of a sleeve X permits the valve and yoke to be used interchangeably with casings of different sizes, so that it will be unnecessary to throw away used casings which are the heaviest and most valuable portions of the device, but the valve seat can be recut or trimmed therein and the casings will be as perfect as before, and the valve and seat can be made to perfectly correspond with each other.

Cutters can be provided that can be interchanged to correspond with any form of valve and seat, so as to utilize any old casings.

Having described the invention what I claim as new and desire to secure by Letters Patent is:

1. In combination, a casing having a valve seat therein, and provided with an exterior opening for the insertion of a valve, a closure for said opening having a screw threaded outer extremity, a yoke adjustable thereon, a valve stem and valve thereon, movable longitudinally with said yoke and revoluble therein, a lever rotatable about said stem and alternatively engageable therewith and with said yoke whereby said yoke can be rotated to adjust the position of said valve relatively to said seat and, alternatively therewith, said valve can be rotated upon said seat, substantially as described.

2. In combination, a casing provided with a valve seat and also having an external opening for the introduction of a valve, a closure for said opening, a rotatable yoke longitudinally adjustable upon said closure, clamping means therefor, a valve, a valve stem governing said valve longitudinally movable with said yoke, a disk upon said yoke loosely surrounding said stem, a corresponding disk secured to said valve stem, and a lever alternatively engageable with said disks, for alternatively rotating said yoke and stem, and means for attaching said lever in place, substantially as described.

3. In combination, a valve casing, a seat therein, said casing having an external opening, a closure therefor, a rotatable yoke longitudinally adjustable upon said closure, a valve, a valve stem governing said valve longitudinally movable with and rotatably mounted in said yoke, means for alternatively engaging said yoke and valve stem to separately rotate the same, a second stem interchangeable with the aforesaid stem, and a seat cutting attachment secured to said second stem and operable therewith, substantially as described.

4. In combination, a valve casing having an exterior opening, a closure for said opening, a valve seat in said casing, a stem and valve, a rotatable support for said stem adjustable on said closure, said stem being rotatably mounted in said support, a second stem interchangeable with the aforesaid stem, a cutting tool adjustably secured to said second stem, means for clamping said stem support in adjusted position upon said closure, and a common means for alternatively rotating the stem and the support.

In testimony whereof, I hereunto set my hand this 14th day of December, 1914.

JOSEPH B. MOWRY.

In presence of—
RALPH W. JEREMIAH,
WM. M. MONROE.

Copies of this patent may be obtained for five cents each, by addressing the "Commissioner of Patents, Washington, D. C."